US012734834B2

(12) United States Patent
Mitsuhashi

(10) Patent No.: US 12,734,834 B2
(45) Date of Patent: Sep. 15, 2026

(54) INKJET RECORDING APPARATUS AND INKJET RECORDING METHOD

(71) Applicant: Konica Minolta, Inc., Tokyo (JP)

(72) Inventor: Taku Mitsuhashi, Hachioji (JP)

(73) Assignee: KONICA MINOLTA, INC., Tokyo (JP)

( * ) Notice: Subject to any disclaimer, the term of this patent is extended or adjusted under 35 U.S.C. 154(b) by 165 days.

(21) Appl. No.: 18/815,066

(22) Filed: Aug. 26, 2024

(65) Prior Publication Data

US 2025/0074082 A1 Mar. 6, 2025

(30) Foreign Application Priority Data

Aug. 31, 2023 (JP) ................................. 2023-141669

(51) Int. Cl.

*B41J 2/21* (2006.01)
*B41J 3/407* (2006.01)
*B41J 11/00* (2006.01)
*D06P 5/30* (2006.01)

(52) U.S. Cl.

CPC .......... *B41J 11/0095* (2013.01); *B41J 2/2117* (2013.01); *B41J 3/4078* (2013.01); *D06P 5/30* (2013.01)

(58) Field of Classification Search

CPC ........ B41J 2/01; B41J 2/04556; B41J 2/2114; B41J 2/2117; B41J 3/4078; B41J 11/007; B41J 11/0095; B41J 11/20; B41J 25/34; B41J 29/387; B41M 5/0011; B41M 7/00; C09D 11/322; D06P 5/30

See application file for complete search history.

(56) References Cited

U.S. PATENT DOCUMENTS 9,321,921 B2 * 4/2016 Namba .................. C09D 11/40
2016/0368292 A1 12/2016 Kurosawa
2017/0015113 A1 1/2017 Yamashita
2018/0056678 A1 * 3/2018 Otsuka ................ B41J 11/0095
2018/0111395 A1 4/2018 Sugaya
2020/0247148 A1 * 8/2020 Hirato ...................... B65H 5/22

(Continued)

FOREIGN PATENT DOCUMENTS

EP 4230417 A1 8/2023
JP 2007-076109 A 3/2007

(Continued)

OTHER PUBLICATIONS

Extended European Search Report, dated Jan. 22, 2025, issued for the corresponding European Patent Application No. 24196848.6, 11 pages.

*Primary Examiner* — Anh T Vo

(74) *Attorney, Agent, or Firm* — LUCAS & MERCANTI, LLP

(57) ABSTRACT

An inkjet recording apparatus includes, a conveyor that conveys a recording medium; an image former that forms an image on the recording medium; and a detector that detects a state of the recording medium. The image former includes, a first ejection head that ejects a first liquid onto the recording medium, and a second ejection head that ejects a second liquid onto the recording medium. The detector detects a state of the recording medium after the first liquid is ejected by the first ejection head and before the second liquid is ejected by the second ejection head.

14 Claims, 7 Drawing Sheets

(56) References Cited

U.S. PATENT DOCUMENTS

| | | | | |
|---|---|---|---|---|
| 2020/0391533 | A1* | 12/2020 | Gotou | B41J 2/2107 |
| 2021/0291551 | A1* | 9/2021 | Mataki | B41J 2/2114 |
| 2023/0226815 | A1* | 7/2023 | Hosaka | B41J 2/0451 |

FOREIGN PATENT DOCUMENTS

| | | | |
|---|---|---|---|
| JP | 2011-178053 | A | 9/2011 |
| JP | 2015-110275 | A | 6/2015 |
| JP | 2017-024379 | A | 2/2017 |

* cited by examiner

INKJET RECORDING APPARATUS AND INKJET RECORDING METHOD

CROSS-REFERENCE TO RELATED APPLICATIONS

The entire disclosure of Japanese Patent Application No. 2023-141669, filed on Aug. 31, 2023, including description, claims, drawings and abstract is incorporated herein by reference.

BACKGROUND OF THE INVENTION

Technical Field

The present invention relates to an inkjet recording apparatus and an inkjet recording method.

Description of Related Art

Conventionally, inkjet recording apparatuses that record an image by ejecting ink onto a recording surface of a recording medium have been known. In particular, in-line inkjet recording apparatuses are known that eject a pretreatment liquid during conveyance of the recording medium.

However, as a result of ejecting an excessive amount of the pretreatment liquid onto the recording medium, the recording medium may absorb and expand to cause lifting wrinkles. Then, when the head of the inkjet recording apparatus comes into contact with the lifting wrinkle, an image forming defect may occur.

Therefore, for example, Japanese Unexamined Patent Publication No. 2015-110275 describes an inkjet recording apparatus in which a light interruption sensor is provided on an upstream side of a conveyance apparatus, and in a case where lifting of a recording medium is detected, image formation is temporarily interrupted and a warning is issued.

However, in the inkjet recording apparatus of Japanese Unexamined Patent Publication No. 2015-110275, it is not possible to detect the lifting wrinkle generated by ejecting the pre-processing liquid. In addition, it is not possible to suppress defects caused by the application of the pretreatment liquid, not limited to the lifting wrinkles.

Similarly, in a case where the post-treatment liquid is ejected by the in-line method after the ink is ejected onto the recording medium, the head for the post-treatment liquid may come into contact with the lifting wrinkles generated by the ejection of the ink. However, in the inkjet recording apparatus of Japanese Unexamined Patent Publication No. 2015-110275, such a problem could not be suppressed.

SUMMARY OF THE INVENTION

The present invention has been made in view of such circumstances. It is an object of the present invention to provide an inkjet recording apparatus and an inkjet recording method that can suppress failures caused by in-line application of a first liquid such as a pretreatment liquid.

In order to solve the above problem, an inkjet recording apparatus includes a conveyor that conveys a recording medium, an image former that forms an image on the recording medium; and a detector that detects a state of the recording medium, wherein, the image former includes, a first ejection head that ejects a first liquid onto the recording medium, and a second ejection head that ejects a second liquid onto the recording medium, and the detector detects a state of the recording medium after the first liquid is ejected by the first ejection head and before the second liquid is ejected by the second ejection head.

According to another aspect, an inkjet recording method of an inkjet recording apparatus, the inkjet recording apparatus including, a first ejection head that ejects a first liquid onto a recording medium, and a second ejection head that ejects a second liquid onto the recording medium, the inkjet recording method comprising: conveying the recording medium; forming an image on the recording medium; and detecting a state of the recording medium, wherein in the detecting, a state of the recording medium after the first liquid is ejected by the first ejection head and before the second liquid is ejected by the second ejection head is detected.

BRIEF DESCRIPTION OF THE DRAWINGS

The advantages and features provided by one or more embodiments of the invention will become more fully understood from the detailed description given hereinafter and the appended drawings which are given by way of illustration only, and thus are not intended as a definition of the limits of the present invention, and wherein.

DETAILED DESCRIPTION

Figure 1:
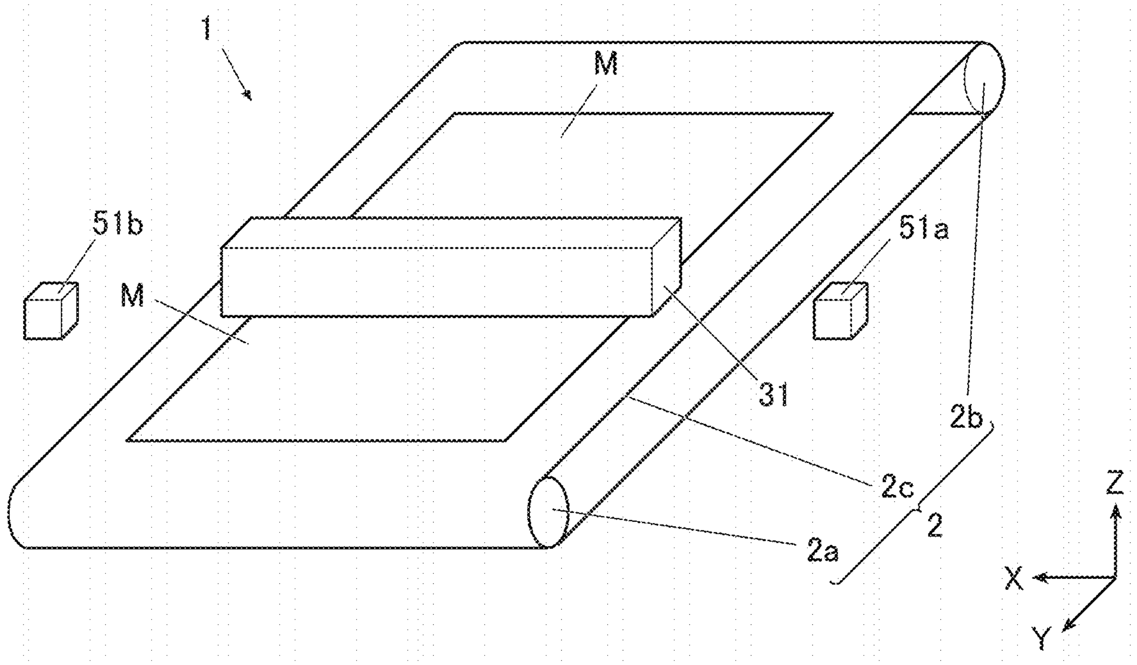
FIG. 1 is a perspective view of an inkjet recording apparatus.

Hereinafter, one or more embodiments of the present invention will be described with reference to the drawings. However, the scope of the invention is not limited to the disclosed embodiments.

Hereinafter, an inkjet recording apparatus according to an embodiment of the present invention will be described in detail with reference to the drawings. However, the scope of the invention is not limited to the illustrated examples. In the following description, components having the same functions and configurations are denoted by the same reference numerals, and the description thereof will be omitted.

Figure 2:
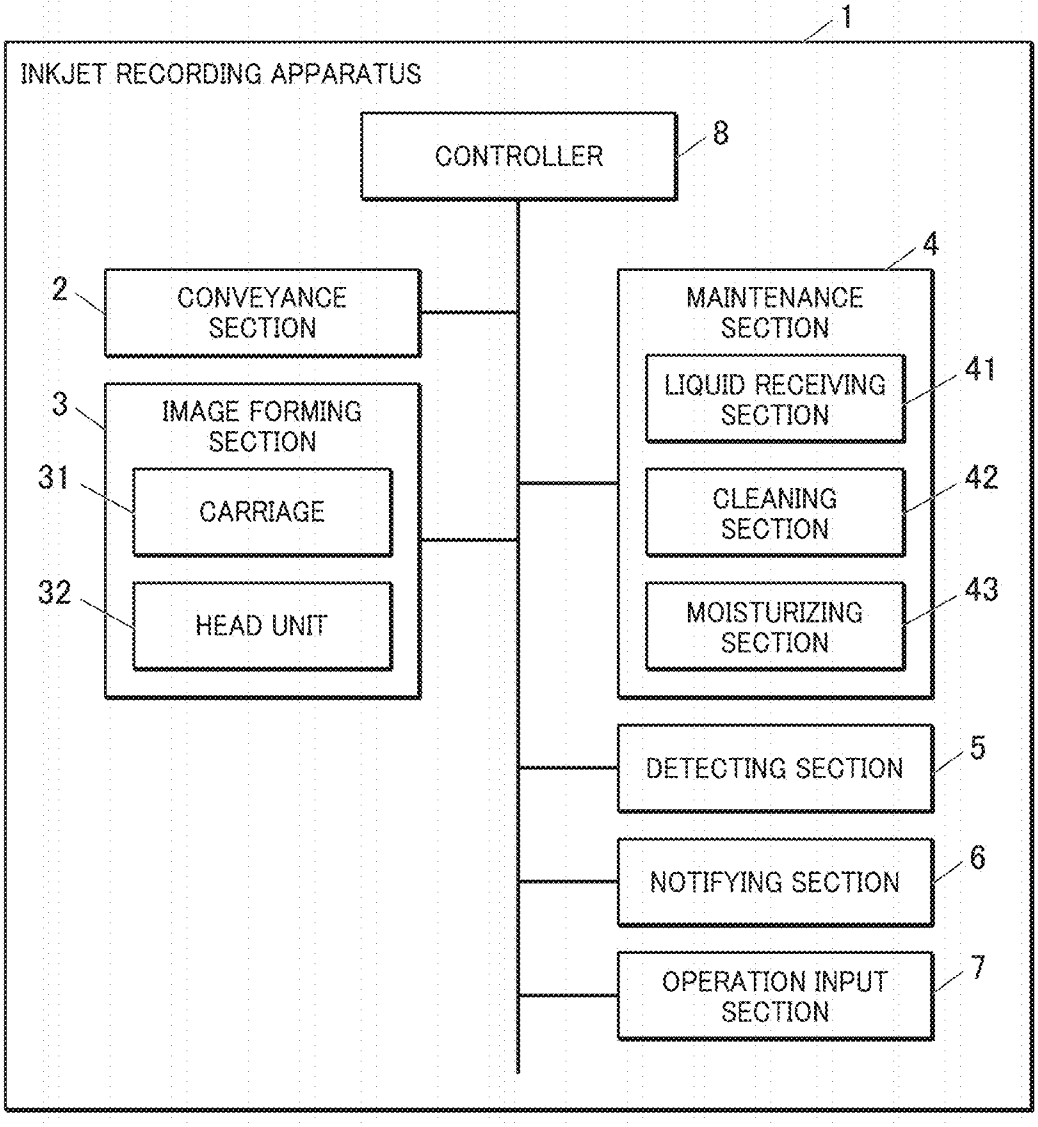
FIG. 2 is a block diagram of the inkjet recording apparatus.
Figure 3:
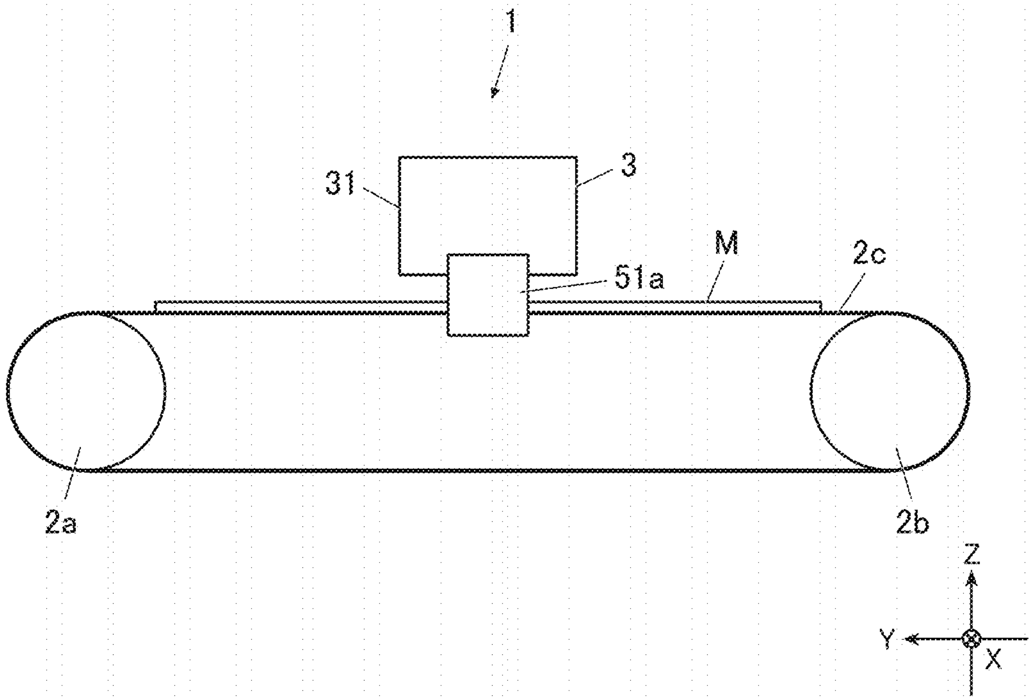
FIG. 3 is a side view of the inkjet recording apparatus as viewed in a width direction.

Overall Configuration of Inkjet Recording Apparatus According to First Embodiment FIG. 1 is a perspective view of the inkjet recording apparatus according to a first embodiment of the present invention. FIG. 2 is a block diagram of the inkjet recording apparatus according to the first embodiment of the present invention. FIG. 3 is a side view of the inkjet recording apparatus 1. The inkjet recording apparatus 1 includes a conveyance section 2 (conveyor), an image forming section 3 (image former), a maintenance section 4, a detecting section 5 (detector), a notifying section 6 (notifier), an operation input section 7, and a controller 8 (hardware processor).

Note that hereinafter, an X direction, a Y direction, and a Z direction refer to the directions illustrated in FIG. 1. Furthermore, in the following description, the X direction, the Y direction, and the Z direction are referred to as a width direction, a conveyance direction, and a height direction, respectively. FIG. 1 shows a configuration in which the maintenance section 4 is omitted for convenience.

(Conveyance Section)

The conveyance section 2 conveys a recording medium M in the conveyance direction so as to pass below the image forming section 3. The conveyance section 2 includes, for example, two conveyance rollers 2*a* and 2*b* that rotate in the conveyance direction around rotation shafts extending in a widthwise direction. Furthermore, the conveyance section 2 includes a ring-shaped conveyance belt 2*c*.

The inner side of the conveyance belt 2*c* is supported by the conveyance rollers 2*a* and 2*b*. In addition, an adhesive is applied to a conveyance surface of the conveyance belt 2*c*, which is a surface different from an inner surface that comes into contact with the conveyance rollers 2*a* and 2*b* and is an outer surface on a side on which the recording medium M is placed. The recording medium M is placed on the conveyance surface of the conveyance belt 2*c*. The conveyance rollers 2*a* and 2*b* rotate and circulate in the conveyance direction in accordance with an operation of a conveyance motor of the roller. As a result, the conveyance belt 2*c* conveys the recording medium M in the conveyance direction.

The recording medium M is, for example, fabric. The recording medium M is supplied onto the conveyance belt 2*c* by a medium supply section (not shown). An image is recorded on the recording medium M by ink ejected from the image forming section 3. The recording medium M on which the image is recorded is discharged to a discharge section (not shown). Note that the recording medium M is not limited to fabric. The recording medium M may be any recording medium on which landed ink can be fixed, and may be any of various media such as paper.

In the case where the recording medium M is a fabric, if the fabric is a thin cloth having a thickness of 0.4 mm or less or a basis weight of 90 g/m2 or less, or if the fabric is made from cotton or polyester, lifting wrinkles are likely to occur due to excessive application of the pre-treatment liquid described later. Usually, image formation failure occurs when the image is formed with the lifting wrinkle formed on the recording medium M, but the inkjet recording apparatus 1 according to the present embodiment can detect the lifting wrinkles before image formation.

(Image Forming Section)

Figure 4:
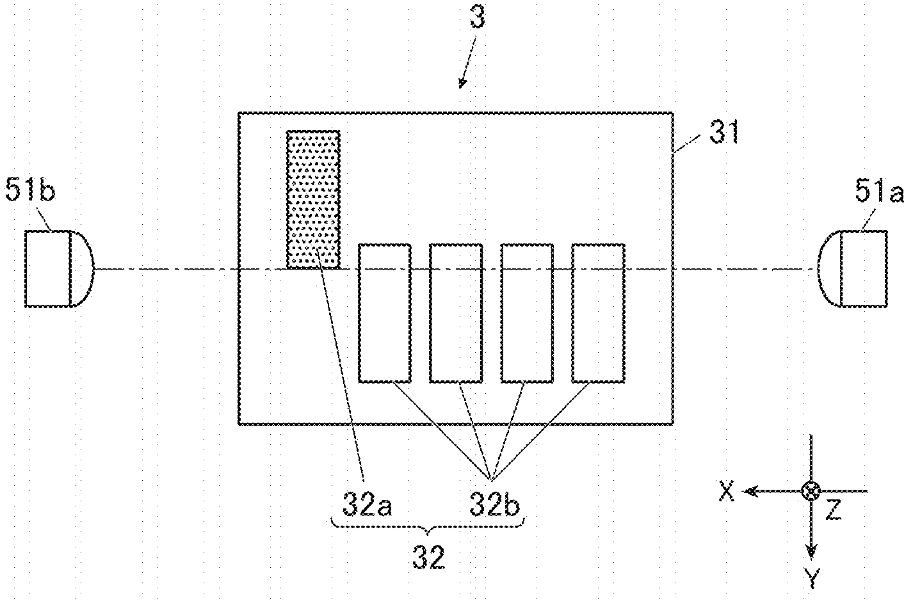
FIG. 4 is a plan view of an image forming section of the inkjet recording apparatus as viewed in a height direction.

The image forming section 3 forms the image by ejecting the ink onto the recording medium M conveyed by the conveyance section 2 at an appropriate timing based on image data acquired from an external device or the like. FIG. 4 is a view of the image forming section 3 as seen from the height direction. As illustrated in FIG. 4, the image forming section 3 includes a carriage 31 and a head unit 32.

{Carriage}

The carriage 31 is a member that moves the mounted head unit 32. The carriage 31 includes, for example, a belt bridged between two pulleys that are rotated by a motor (not illustrated). The carriage 31 causes the head unit 32 to scan in the width direction by a rotating operation of the motor based on a drive signal output by the controller 8. Furthermore, the pulley and the belt are extended further to the outside than a conveyance path along which the recording medium M is conveyed. Therefore, the carriage 31 is movable further outward than the conveyance path of the recording medium M.

The inkjet recording apparatus 1 according to the present embodiment forms the image by ejecting the ink from the head unit 32 while allowing the carriage 31 to scan in the width direction, the carriage 31 being shorter than the recording medium M in length in the width direction. The inkjet recording apparatus 1 may employ a single-pass (one pass) method in which the image is formed by allowing the carriage 31 to scan once, or a multi-pass (scan) method in which an image of one line is formed by allowing the carriage 31 to scan a plurality of times.

{Head Unit}

The head unit 32 is constituted by a plurality of inkjet heads. Each inkjet head includes an ink tank, a channel, a piezoelectric element, a plurality of nozzles, and the like. Under the control of the controller 8, the head unit 32 causes the piezoelectric element to apply pressure fluctuation to ink supplied from the tank to the nozzle via the channel, thereby ejecting the ink. The inkjet heads constituting the head unit 32 are a first ejection head 32*a* and a second ejection head 32*b*.

<First Ejection Head>

The first ejection head 32*a* is an inkjet head that ejects a first liquid onto the recording medium M prior to the second ejection head 32*b*. In the present embodiment, the first liquid is the pretreatment liquid containing an aggregating agent. As illustrated in FIG. 4, in the carriage 31, the first ejection head 32*a* is mounted on an upstream side in the conveyance direction relative to the second ejection head 32*b*.

The pre-treatment liquid ejected from the first ejection head 32*a* is mixed in liquid form with the second liquid ejected from the second ejection head 32*b* on the recording medium M. The pretreatment liquid contains at least the aggregating agent. The pretreatment liquid may further contain other components such as a solvent, a surfactant, and water. The aggregating agent contained in the pretreatment liquid is not particularly limited as long as it generates an aggregate when coming into contact with the second liquid, and examples thereof include a polyvalent metal salt, an organic acid, and an inorganic acid.

<Second Ejection Head>

The second ejection head 32*b* ejects the second liquid after the first ejection head 32*a* ejects the pre-treatment liquid that is the first liquid. In the present embodiment, the second liquid is colored ink. As illustrated in FIG. 4, the image forming section 3 may include a plurality of second ejection heads 32*b*. The plurality of second ejection heads 32*b* eject colored inks of, for example, C (cyan), M (magenta), Y (yellow), and K (black), respectively.

The colored ink ejected by the second ejection head 32*b* is, for example, pigment ink. The pigment ink is an ink containing a pigment, resin particles (binder resin), and water. When the pigment ink is applied to the recording medium M on which the pretreatment liquid has been applied, the components contained in the pigment ink do not penetrate into the recording medium M, the color developability increases, and the texture is less likely to be impaired.

In addition, unlike dye ink, the pigment ink does not require heating treatment for dyeing and treatment for washing away undyed dye.

(Maintenance Section)

Figure 5:
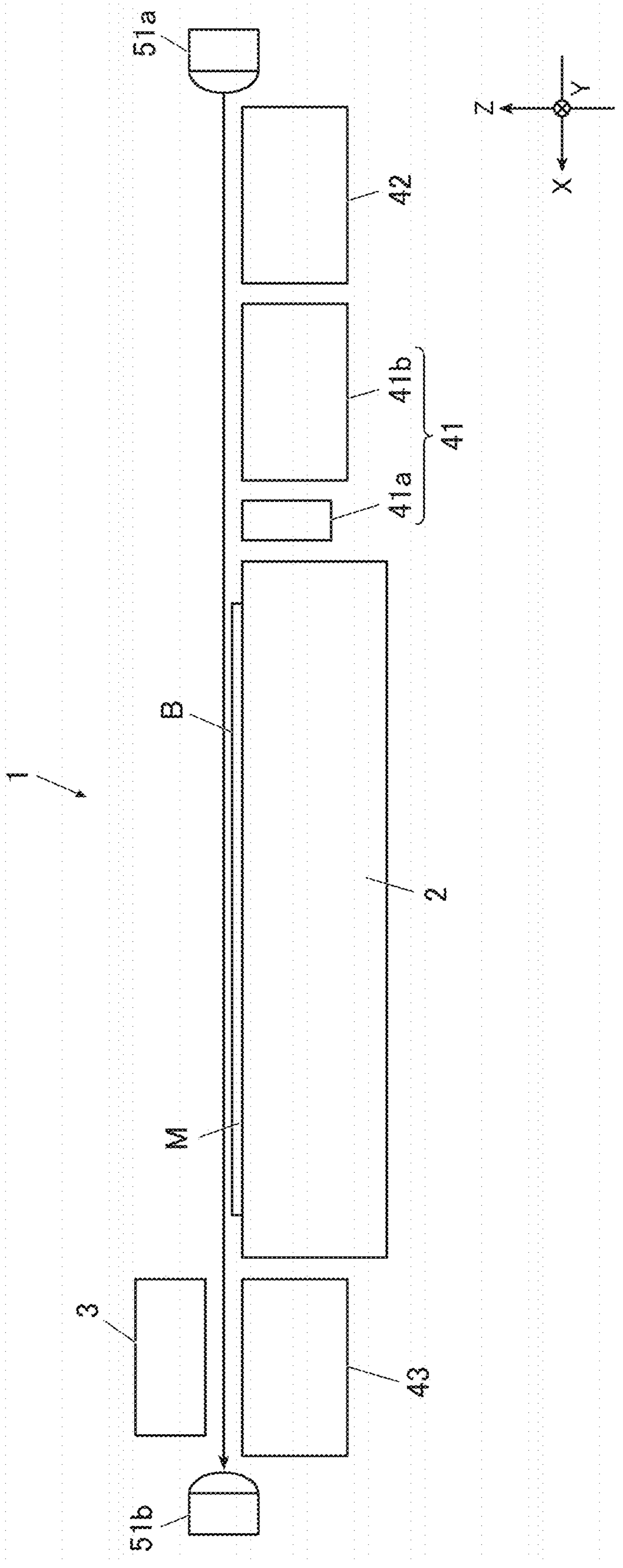
FIG. 5 is a plan view of the inkjet recording apparatus according to a first embodiment when viewed from a conveyance direction.

FIG. 5 is a view of the inkjet recording apparatus 1 from a downstream side in the conveyance direction. The maintenance section 4 includes a liquid receiving section 41, a cleaning section 42, and a moisturizing section 43 on the outside in the width direction relative to the conveyance path of the recording medium M.

{Liquid Receiving Section}

The liquid receiving section 41 receives liquid (pretreatment liquid and colored ink) ejected from the head unit 32. In the liquid receiving section 41, an absorber such as a sponge having hydrophilicity is stored. The liquid receiving section 41 discharges, from a discharge port provided in a bottom surface portion or the like, the liquid ejected and received from the head unit 32. The liquid receiving section 41 includes a discard tub 41*a* and a maintenance tub 41*b*.

<Discard Tub>

The discard tub 41*a* is provided closer to the conveyance path of the recording medium M than the maintenance tub 41*b*. The length of the discard tub 41*a* in the width direction is slightly larger than one nozzle row in one inkjet head.

The controller 8 causes the discard tub 41*a* to execute a discarding ejection of the ink every time the carriage 31 scans. The control can prevent the liquids (the pretreatment liquid and the colored ink) in each inkjet head from drying and thickening in the nozzles.

In FIG. 5, a configuration in which the discard tub 41*a* is provided only on one side in the widthwise direction of the inkjet recording apparatus 1 is exemplified, but the invention is not limited thereto. For example, in a case of a configuration in which the image is formed not only when the carriage 31 is caused to perform scanning from one width-direction side to the opposite width-direction side but also when the carriage 31 is caused to perform scanning from the other width-direction side to the one width-direction side, the discard tub 41*a* may be provided on both sides of the inkjet recording apparatus 1.

<Maintenance Tub>

The maintenance tub 41*b* is provided farther from the conveyance path of the recording medium M than the discard tub 41*a*. The maintenance tub 41*b* is provided so as to be slightly wider than the carriage 31 in the widthwise direction.

In a case where normal pressure is not applied to the ink and the ink is not ejected from the nozzles of each inkjet head and an image defect occurs (in a case where a so-called nozzle clogging phenomenon occurs), the controller 8 conveys the carriage 31 above the maintenance tub 41*b* and causes purging to be executed. Specifically, in order to eject foreign matters, air bubbles, aggregates, and the like in each inkjet head to the outside, the controller 8 increases the supply pressure of the ink to each inkjet head to forcibly eject the ink.

Note that the amount of ink ejected by purging is greater than the amount of ink ejected by discard ejection. Therefore, as shown in FIG. 5, the maintenance tub 41*b* is provided so as to have a larger volume than the discard tub 41*a*.

{Cleaning Section}

The cleaning section 42 is provided in the vicinity of the maintenance tub 41*b*, and wipes an ink ejection face of the head unit 32 after purging with a wiping cloth or the like. The cleaning section 42 includes a wiping cloth and a moving mechanism that moves the wiping cloth along the ink ejection face of the head unit 32. The wiping operation of the cleaning section 42 can remove ink, foreign matter, and the like adhered to the ink ejection face of the head unit 32 during purging.

{Moisturizing Section}

The moisturizing section 43 is a container in which a predetermined liquid such as water is accommodated and the nozzle surface side of the image forming section 3 is opened. The liquid contained in the moisturizing section 43 is evaporated to humidify the nozzles of the head unit 32 when not in use, thereby preventing the nozzles from being clogged.

(Detecting Section)

The detecting section 5 detects a state of the recording medium M, in particular, lifting of the recording medium M from a reference surface B. The detecting section 5 is, for example, a light interruption sensor. The detecting section 5 includes a light emitter 51*a* and a light receiver 51*b*. The light emitter 51*a* emits a linear laser beam having a predetermined width in a height direction. The light receiver 51*b* receives the laser beam emitted by the light emitter 51*a*.

As shown in FIG. 5, the light emitter 51*a* and the light receiver 51*b* are provided outside the conveyance section 2 in the widthwise direction and outside a printing scanning range in which the carriage 31 moves during image formation. The light receiver 51*b* is arranged on an optical axis of the light emitter 51*a* so as to be parallel to the width direction. To be more specific, as shown in FIG. 4, the light emitter 51*a* and the light receiver 51*b* are arranged on the downstream side of the first ejection head 32*a* in the conveyance direction so that the optical axis is positioned on a straight line parallel to the nozzle row of the second ejection head 32*b*. Therefore, the detecting section 5 can detect the lifting of the recording medium M after the first ejection head 32*a* ejects the pretreatment liquid that is the first liquid and before the second ejection head 32*b* ejects the second liquid.

The detecting section 5 detects a lifting wrinkle of the recording medium M during image formation by the image forming section 3, To be specific, the light receiver 51*b* detects the light blocking, that is, the generation of the lifting wrinkle when the lifting of the recording medium M becomes equal to or more than a predetermined threshold value, for example, a length between the second ejection head 32*b* and the reference surface B, and the amount of light acquired from the light emitter 51*a* decreases by a predetermined value or more. The light receiver 51*b* that has detected the occurrence of the lifting wrinkle transmits a signal to the controller 8. Upon receiving the signal, the controller 8 causes the image forming section 3 to stop the image forming operation and causes the notifying section 6 to issue a warning.

Note that the position of the detecting section 5 in the height direction is adjustable. Therefore, the reference surface B can be appropriately set in accordance with the thickness or the like of the recording medium M. In FIG. 5, the reference surface B is the front surface of the recording medium M, but is not limited thereto.

Further, in the present embodiment, as shown in FIG. 5, the light emitter 51*a* and the light receiver 51*b* are arranged so that the discard tub 41*a* and the maintenance tub 41*b* are positioned under the optical axis. With the above-described configuration, the light receiver 51*b* transmits the signal to the controller 8 not only when the lifting wrinkle appears in the recording medium M, but also when the recording medium M is shielded from light by the discard tub 41*a* or the maintenance tub 41*b*.

When the discharge port of the discard tub 41*a* or the maintenance tub 41*b* is clogged, the color ink and the pretreatment liquid may be mixed. In this case, the color ink and the pretreatment liquid may be aggregated in the discard tub 41*a* or the maintenance tub 41*b* to form the aggregate. Then, the aggregate that has reached the predetermined height and the head unit 32 may come into contact with each other, resulting in damage to the head unit 32.

However, with the above-described arrangement, the light receiver 51*b* transmits the signal to the controller 8 also in a case where the height of the aggregate in the discard tub 41*a* or the maintenance tub 41*b* is, for example, greater than or equal to the distance between the second ejection head 32*b* and the discard tub 41*a* or the maintenance tub 41*b*. Therefore, damage to the head unit 32 due to contact between the aggregate and the head unit 32 can be prevented.

(Notifying Section)

The notifying section 6 provides notification of various information under the control of the controller 8. The notifying section 6 is, for example, a display part having a screen, a sound emitting section that emits a predetermined sound, a communication section that can communicate with another device via a network, or the like.

(Operation Input Section)

The operation input section 7 is composed of, for example, various operation keys and the like, converts a user's input operation into an operation signal, and outputs the operation signal to the controller 8. Note that when the notifying section 6 is a display part, the operation input section 7 may be a touch screen.

(Controller)

The controller 8 (hardware processor) includes a central processing unit (CPU), a random access memory (RAM), and a read only memory (ROM). Thus, the controller 8 controls the overall operation of the inkjet recording apparatus 1.

The CPU controls each part of the inkjet recording apparatus 1. The RAM is a volatile memory that temporarily stores various kinds of information in a writable and readable manner. The ROM is a non-volatile memory in which various types of information and programs are stored in a readable manner. More specifically, the controller 8 causes the CPU to read a specified program from various programs stored in the ROM and load the program into the RAM. Then, the controller 8 executes various kinds of processing in coordination with the loaded program.

In particular, the controller 8 functions as an image formation controller that controls whether to cause the image forming section 3 to form an image in accordance with a detection result of the detecting section 5. The controller 8 also functions as a notification controller that causes the notifying section 6 to issue the warning in accordance with the detection result of the detecting section 5.

[Image Forming Processing]

Figure 6:
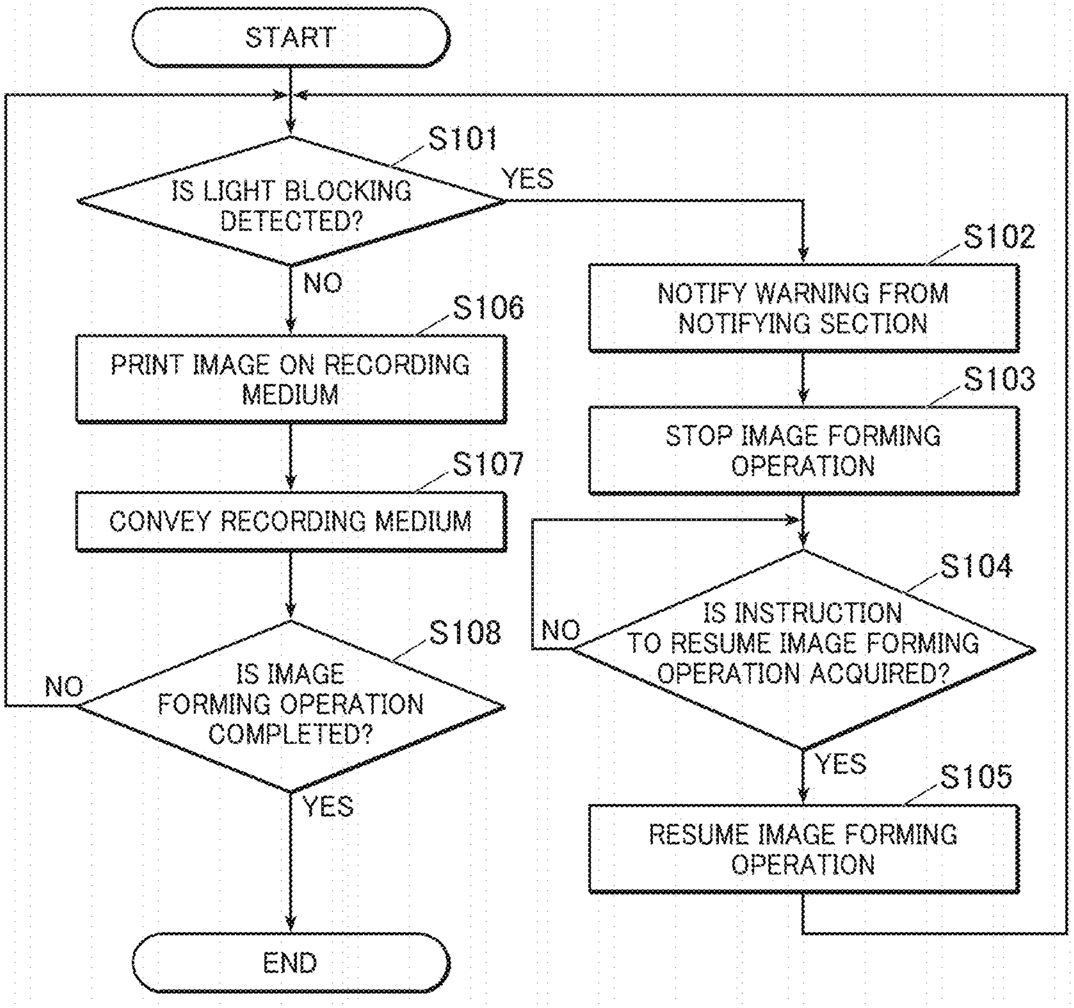
FIG. 6 is a flowchart of image forming processing of the inkjet recording apparatus.

Image forming processing in such an inkjet recording apparatus 1 will be described with reference to the flowchart of FIG. 6.

First, the controller 8 determines whether or not the detecting section 5 has detected lifting (light blocking) (step S101). When the detecting section 5 detects lifting (step S101; Yes), the controller 8 serving as a notification controller causes the notifying section 6 to issue the warning (step S102). Further, the controller 8 serving as the image forming controller causes the conveyance section 2 and the image forming section 3 to stop the image forming operation (step S103).

Upon being notified by the notifying section 6, the user smooths out and corrects the lifting wrinkle generated on the recording medium M. Alternatively, the recording medium M is manually conveyed to evacuate the lifting wrinkle to the outside of the printing region. Then, the user adjusts the amount of the pretreatment liquid to be ejected by the first ejection head 32*a* to be small. Alternatively, the user cleans the discard tub 41*a* or the maintenance tub 41*b*. When the processing relating to the lifting wrinkles of the recording medium M or the aggregate in the liquid receiving section 41 is finished, the user transmits an instruction to resume the image forming operation to the controller 8 by operating the operation input section 7.

The controller 8 determines whether an instruction to resume the image forming operation has been acquired (step S104). If the instruction to resume the image forming operation is acquired (step S104; Yes), the controller 8 resumes the image forming operation (step S105), and transitions to step S101 to detect the lifting again.

In a case where the detecting section 5 does not detect lifting (step S101; No), the controller 8 forms an image on the recording medium M by discharging ink from the second ejection head 32*b* while the carriage 31 performs scanning (step S106). After scanning by the carriage 31, the controller 8 causes the conveyance section 2 to convey the recording medium M by a predetermined amount (step S107).

The controller 8 determines whether the image forming operation has been completed (step S108). In the case where the image forming operation is completed (Step S108; Yes), the controller 8 ends the image forming process. If the image forming operation has not been completed (step S108; No), the controller 8 transitions to step S101.

Effects of Embodiment

As described above, the inkjet recording apparatus 1 according to the present embodiment includes the conveyance section 2 to convey the recording medium M. The inkjet recording apparatus 1 further includes an image forming section 3 to form the image on the recording medium M. The inkjet recording apparatus 1 further includes a detecting section 5 to detect the condition of the recording medium M. The image forming section 3 includes the first ejection head 32*a* that ejects the pretreatment liquid, which is the first liquid, onto the recording medium M. Furthermore, the image forming section 3 includes the second ejection head 32*b* that ejects ink, which is the second liquid, onto the recording medium M. Then, the detecting section 5 detects the state of the recording medium M after the first ejection head 32*a* ejects the first liquid and before the second ejection head 32*b* ejects the second liquid.

With this structure, even if a state occurs in which a failure is caused by the application of the pretreatment liquid by the first ejection head 32*a*, the state can be suppressed by the detecting section 5 sensing it. In particular, since the detecting section 5 detects lifting of the recording medium M from the reference surface, it is possible to suppress occurrence of image formation failure on the recording medium M.

In the above description, a configuration in which the light interruption sensor which is the detecting section 5 includes only a pair of the light emitter 51*a* and the light receiver 51*b* is exemplified, but the invention is not limited thereto. That is, the light interruption sensor including a plurality of sets of light emitters 51*a* and light receivers 51*b* corresponding to all the nozzle rows of the head unit 32 may be provided as the detecting section 5. With this configuration, it is possible to further suppress a defect caused by the application of the pretreatment liquid.

Figure 7:
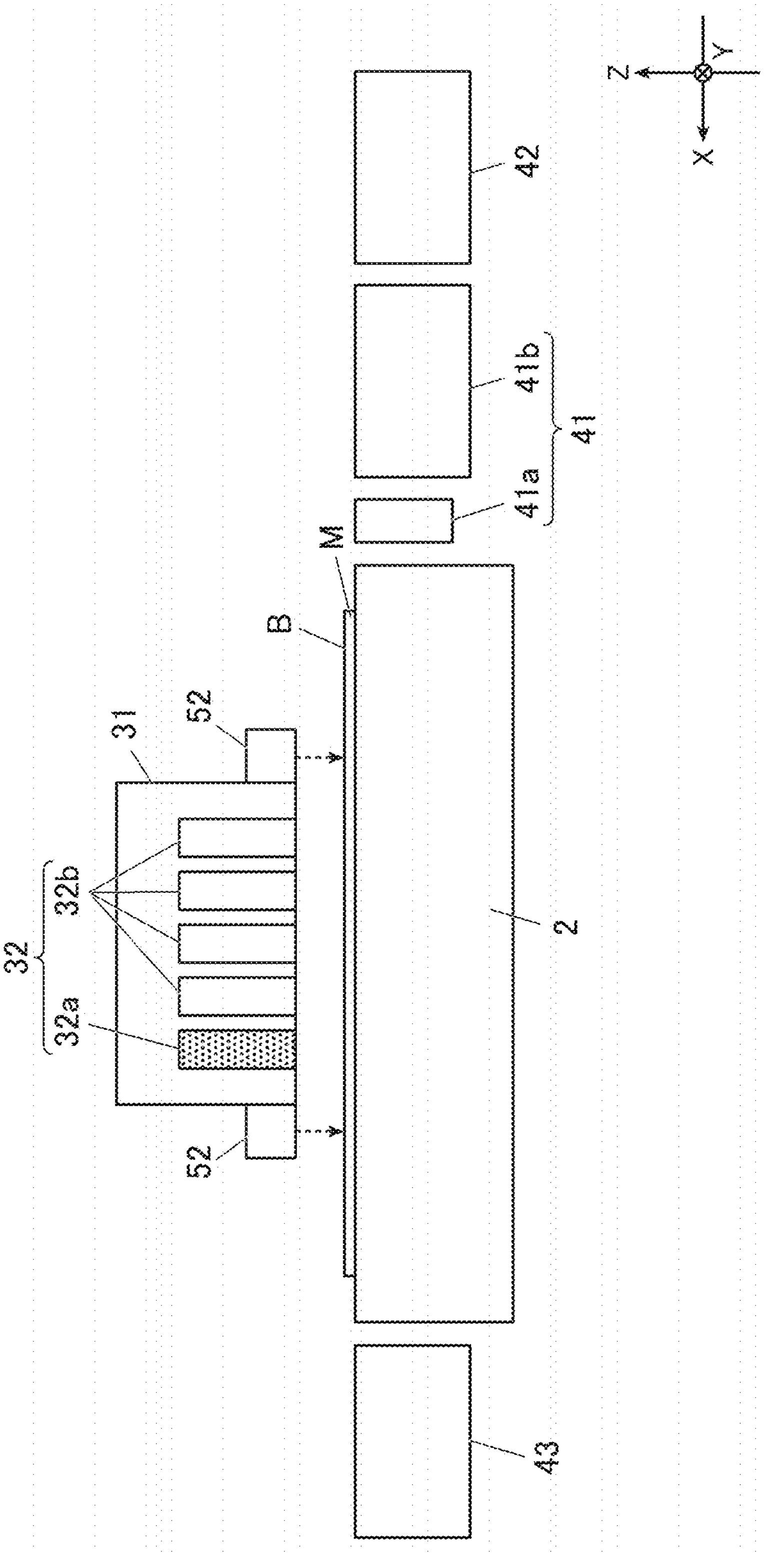
FIG. 7 is a plan view of the inkjet recording apparatus according to a second embodiment as viewed from the conveyance direction.

Overall Configuration of Inkjet Recording Apparatus According to Second Embodiment Next, an inkjet recording apparatus 1 according to a second embodiment will be described. The same symbols are used for the same configuration as that of the inkjet recording apparatus 1 of the first embodiment, and the detailed description is omitted. FIG. 7 is a front view of the inkjet recording apparatus 1 according to the second embodiment. The inkjet recording apparatus 1 according to the second embodiment is different from the first embodiment in that a distance meter 52 which is the detecting section 5 is provided in the carriage 31.

As illustrated in FIG. 7, the inkjet recording apparatus 1 according to the second embodiment includes the distance meter 52 on each of both side surfaces of the carriage 31 in the width direction, respectively. The distance meter 52 measures the distance (height) from the second ejection head 32*b* to the recording medium M during image formation by the image forming section 3, and detects lifting of the recording medium M from the reference surface B based on the measured values. The distance meter 52 can adopt a known configuration, and for example, any of a laser beam type, an ultrasonic wave type, or an optical type can be adopted.

As described above, even in a case where the detecting section 5 includes the distance meter 52, it is possible to sense and suppress a state in which a problem due to application of the preprocessing liquid by the first ejection head 32*a* occurs.

Overall Configuration of Inkjet Recording Apparatus According to Third Embodiment Next, the inkjet recording apparatus 1 according to a third embodiment will be described. Note that elements that are the same as those of the inkjet recording apparatus 1 according to the first and second embodiments are denoted by the same reference numerals, and detailed description of those elements is omitted. The inkjet recording apparatus 1 according to the third embodiment is different from the first and second embodiments in that the first liquid ejected from the first ejection head 32*a* is a colored ink and the second liquid ejected from the second ejection head 32*b* is a post-treatment liquid.

In the inkjet recording apparatus 1 according to the third embodiment, the post-treatment liquid ejected by the second ejection head 32*b* is, for example, a colorless coating ink. Even in a case where the first ejection head 32*a* ejects colored ink, the recording medium M may contract and expand to cause lifting wrinkles. Then, the second ejection head 32*b* comes into contact with the lifting wrinkle, and a failure such as breakage may occur.

However, in the present invention, as described above, the detecting section 5 is provided which detects the state of the recording medium M after the ejection of the first liquid by the first ejection head 32*a* and before the second ejection head 32*b* ejects the second liquid. Therefore, in the inkjet recording apparatus 1 according to the third embodiment, even if a state in which a failure is caused due to ink application by the first ejection head 32*a* occurs, the state can be suppressed by sensing by the detecting section 5.

[Other Configurations]

Although specific description has been given above based on the embodiment according to the present invention, the present invention is not limited to the above-described embodiment. It is a matter of course that the present invention can be subjected to various modifications within the scope of the invention described in the claims and the equivalents thereof.

For example, in the above description, a configuration in which the detecting section 5 detects lifting of the recording medium M has been exemplified, but the invention is not limited thereto. For example, the detecting section 5 may detect a lump of the first liquid or a fold on the recording medium M. In addition, as the detecting section 5, the light interruption sensor and the distance sensor are exemplified, but a contact sensor or the like may be used.

Figure 8:
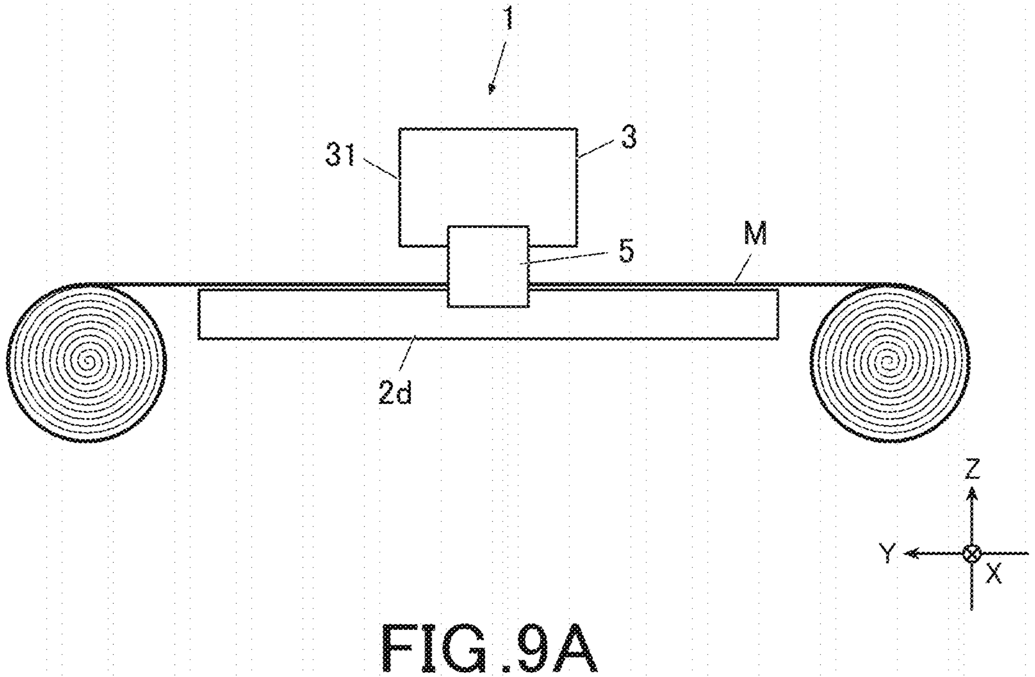
FIG. 8 is a side view of an inkjet recording apparatus according to a modification example as viewed in a width direction.

In addition, in the above description, as shown in FIG. 3, a configuration in which the inkjet recording apparatus 1 includes the conveyance section 2 and transports the recording medium M by a belt transport method is exemplified, but the invention is not limited thereto. That is, as illustrated in FIG. 8, the inkjet recording apparatus 1 may convey the recording medium M by a so-called roll-to-roll method in which tension is applied to the wound recording medium M and the recording medium M is unwound and conveyed. Note that although FIG. 8 illustrates the case where the inkjet recording apparatus 1 includes a platen 2*d*, it is not limited thereto.

In addition, in the above description, as shown in FIG. 4, a configuration in which the first ejection head 32*a* is provided on the upstream side of the second ejection head 32*b* in the conveyance direction in the carriage 31 is exemplified, but the invention is not limited thereto.

Figure 9A:
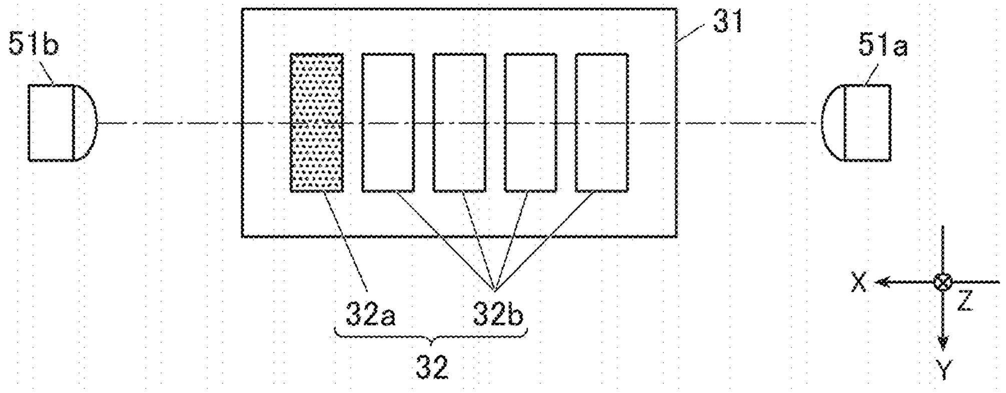
FIG. 9A is a plan view of an inkjet recording apparatus according to a modification example as viewed in a height direction.
Figure 9B:
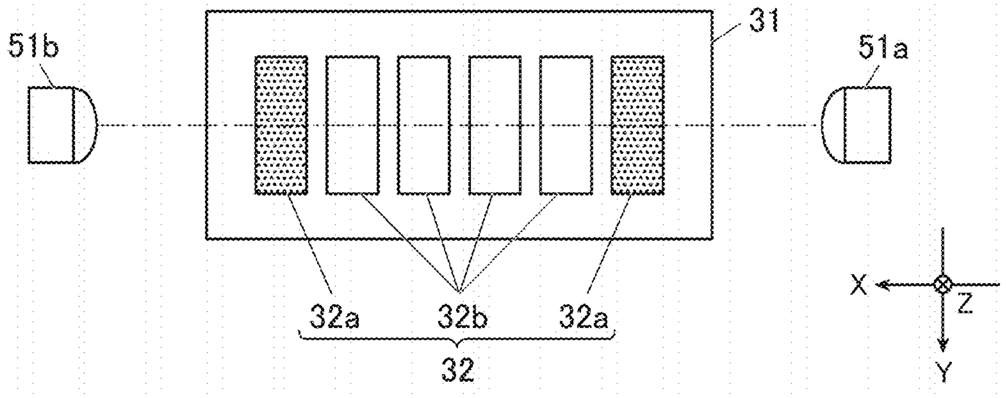
FIG. 9B is a plan view of an inkjet recording apparatus according to a modification example as viewed in a height direction.

As illustrated in FIG. 9A, the first ejection head 32*a* may be provided at a first end of the carriage 31 in the widthwise direction, and the second ejection head 32*a* may be provided at a position parallel to the first ejecting head 32*b* in the widthwise direction. With the above-described configuration, the size of the carriage 31 can be reduced as compared with the configuration illustrated in FIG. 4A. In the above-described configuration, the first liquid cannot be ejected before the second liquid is ejected when the carriage 31 scans in one direction (from left to right in FIG. 9A), which reduces the producibility of the image forming process. Therefore, as illustrated in FIG. 9B, it is preferable to provide the first ejection head 32*a* on both ends of the carriage 31 in the widthwise direction.

In addition, in the above description, a configuration in which the second liquid discharged by the second ejection head 32*b* is color ink is exemplified, but the invention is not limited thereto. That is, in the first and second embodiments, the second liquid may be not only color ink but also the pretreatment liquid, in particular, white ink. Specifically, after the pretreatment liquid containing the aggregation agent is ejected from the first ejection head 32*a*, the white ink may be ejected from the second ejection head 32*b* on the upstream side in the conveyance direction or the width direction, and the color ink may be ejected from the second ejection head 32*b* on the downstream side.

In addition, in the above description, the serial type inkjet recording apparatus 1 which forms an image by scanning the carriage 31 of which the length in the width direction is shorter than the recording medium M in the width direction has been exemplified, but the invention is not limited thereto. That is, in the first and third embodiments, the inkjet recording apparatus 1 may be of a line system in which the head unit 32 having a length in the width direction longer than that of the recording medium M forms the image without scanning in the width direction.

Furthermore, in a case where the notifying section 6 includes a display part, the display part may display, in real time, the lifting displacement of the recording medium M from the reference surface B acquired by the detecting section 5.

In addition, in the image forming process, after the image forming operation is stopped in step S103, the user performs the process related to the lifting wrinkles of the recording medium M or the aggregate in the liquid receiving section 41, and instructs the restart of the image forming operation by the operation input section 7, but the invention is not limited thereto. That is, it may be possible to adopt a configuration in which the inkjet recording apparatus 1 is provided with a mechanism capable of executing processing related to the lifting wrinkles of the recording medium M or aggregates in the liquid receiving section 41 and in which, through processing under the control of the controller 8, the image forming operation is automatically resumed when the detecting section 5 no longer detects the lifting.

Although embodiments of the present invention have been described and illustrated in detail, the disclosed embodiments are made for purposes of illustration and example only and not limitation. The scope of the present invention should be interpreted by terms of the appended claims.

The entire disclosure of Japanese Patent Application No. 2023-141669, filed on Aug. 31, 2023, including description, claims, drawings and abstract is incorporated herein by reference.

What is claimed is:

1. An inkjet recording apparatus comprising:
- a conveyor that conveys a recording medium;
- an image former that forms an image on the recording medium; and
- a detector that detects a state of the recording medium;
- a notifier that notifies a warning; and
- a hardware processor,
- wherein,
- the image former includes, a first ejection head that ejects a first liquid onto the recording medium, and a second ejection head that ejects a second liquid onto the recording medium, and
- the detector detects lifting of the recording medium from a reference surface after the first liquid is ejected by the first ejection head and before the second liquid is ejected by the second ejection head, and
- the hardware processor, in a case in which the detector detects the lifting of the recording medium from the reference surface, causes the image former to stop forming the image and causes the notifier to notify the warning.

2. The inkjet recording apparatus according to claim 1, wherein the first liquid is a pretreatment liquid and the second liquid is ink.

3. The inkjet recording apparatus according to claim 1, wherein the first liquid is ink and the second liquid is a post-processing liquid.

4. The inkjet recording apparatus according to claim 1, further comprising a carriage that conveys the first ejection head and the second ejection head in a width direction orthogonal to a conveyance direction of the recording medium.

5. The inkjet recording apparatus according to claim 4, wherein,
- the detector is a distance meter,
- the distance meter is provided on each of both side surfaces of the carriage in the width direction, and
- the distance meter measures a distance between the recording medium and the second ejection head to detect the lifting of the recording medium from the reference surface.

6. The inkjet recording apparatus according to claim 4, wherein,
- the first ejection head and the second ejection head are mounted substantially parallel to the width direction of the carriage, and
- the detector is provided on a straight line parallel to a nozzle row of the second ejection head.

7. The inkjet recording apparatus according to claim 1, wherein,
- the detector is a light interruption sensor,
- the light interruption sensor includes a light emitter and a light receiver on each outer side of the conveyor in a width direction orthogonal to a conveyance direction of the recording medium, and
- the light emitter and the light receiver have optical axes arranged in the width direction, and detect lifting of the recording medium from the reference surface.

8. The inkjet recording apparatus according to claim 7, wherein the light emitter emits a line-shaped laser beam having a width in a height direction perpendicular to the conveyance direction and the width direction.

9. The inkjet recording apparatus according to claim 1, wherein,
- the notifier includes a display that displays a displacement of the lifting of the recording medium from the reference surface, and
- the detector detects, in real time, the displacement of the lifting of the recording medium from the reference surface.

10. The inkjet recording apparatus according to claim 1, wherein,
- the first ejection head is mounted on an upstream side of the second ejection head in a conveyance direction of the recording medium, and
- the detector is provided on a downstream side of the first ejection head in the conveyance direction.

11. The inkjet recording apparatus according to claim 1, wherein the recording medium is a cloth.

12. The inkjet recording apparatus according to claim 1, wherein the detector includes a hardware processor that detects the lifting of the recording medium after the recording medium is conveyed by the conveyor, and causes the image former to form the image in a case in which the lifting does not exceed a predetermined threshold value.

13. The inkjet recording apparatus according to claim 12, wherein the predetermined threshold value is a distance between the second ejection head and the reference surface.

14. An inkjet recording method of an inkjet recording apparatus, the inkjet recording apparatus including an image former with a first ejection head that ejects a first liquid onto a recording medium and a second ejection head that ejects a second liquid onto the recording medium, the inkjet recording method comprising:
- conveying the recording medium;
- forming, by the image former, an image on the recording medium; and
- detecting a state of the recording medium, wherein in the detecting, lifting of the recording medium from a reference surface is detected after the first liquid is ejected by the first ejection head and before the second liquid is ejected by the second ejection head, and in a case in which the detector detects the lifting of the recording medium from the reference surface, causing the image former to stop forming the image and notifying a warning.

* * * * *